United States Patent
Pressesky et al.

[19]

[11] Patent Number: 5,999,261
[45] Date of Patent: Dec. 7, 1999

[54] SPLIT PHASE HIGH PERFORMANCE, HIGH FREQUENCY, HIGH DYNAMIC RANGE INTERFEROMETER

[75] Inventors: Jason L. Pressesky, Menlo Park; Yuh-Jen Cheng, Cupertino, both of Calif.

[73] Assignee: Seagate Technology, Inc., Scotts Valley, Calif.

[21] Appl. No.: 09/113,668

[22] Filed: Jul. 10, 1998

Related U.S. Application Data

[60] Provisional application No. 60/074,207, Feb. 10, 1998.

[51] Int. Cl.⁶ .................................................. G01B 9/02
[52] U.S. Cl. .................................. 356/351; 356/349
[58] Field of Search .................................. 356/351, 349, 356/358, 345

[56] References Cited

U.S. PATENT DOCUMENTS

| | | | |
|---|---|---|---|
| 4,019,818 | 4/1977 | Vilkomerson | 356/349 |
| 4,514,054 | 4/1985 | Stowe | 356/345 |
| 5,818,588 | 10/1998 | Matsumoto et al. | 356/349 |

*Primary Examiner*—Robert H. Kim
*Attorney, Agent, or Firm*—Merchant & Gould

[57] ABSTRACT

Processing two interference signals to reconstruct a target image includes splitting a laser beam into a reference beam and a measurement beam, and in turn splitting the reference beam into two sub-reference beams. A phase shift is introduced into one of the sub-reference beams, the phase shift being substantially 90 degrees. A measurement beam is reflected from a surface of a moving target, and split into two sub-measurement beams. A first respective sub-reference beam is combined with a first sub-measurement beam, and the second sub-reference beam is combined with the second sub-measurement beam, and the in phase and out of phase signals reconstruct the target surface. Adjustment of the split sub-reference beams is effected by Pockels cells to achieve the desired phase difference between the two sub-reference beams. The reconstructed motion of the target surface is effected with a selected frequency characteristic, spatial resolution and range characteristic.

20 Claims, 4 Drawing Sheets

SPLIT PHASE HIGH PERFORMANCE, HIGH FREQUENCY, HIGH DYNAMIC RANGE INTERFEROMETER

This application is a provision of Ser. No. 60/074,207 filed Feb. 10, 1990.

BACKGROUND OF THE INVENTION

This invention is concerned with interferometers. In particular the invention is directed to a Mach-Zehnder interferometer wherein the light source is split into two beams which propagate via two separate paths. The beams are then recombined at the detector. If the optical path length differs between the two paths, then an interference effect is observed at the detector as a variation in detected light intensity.

The best performance for high resolution interferometer applications is obtained where the light phases are constrained to operate near the so-called quadrature point. This is illustrated in FIG. 1. In this region, the relationship between the path length difference and the optical intensity is nearly linear.

The optical path length may be extracted from the time variation of the light intensity as seen by the detector. Displacement demodulation schemes typically utilize either fringe counting or phase demodulation. The fringe counting technique is typically able to resolve displacements limited to a relatively large fraction of one interference fringe ($\lambda$). In addition fringe counting techniques are not generally suited to high frequency (MHz) applications. In phase demodulation, the interference fringe is maintained at the quadrature position by some feedback mechanism. Small changes about the quadrature point can then be detected.

The resolution capabilities of this technique are intrinsically high and limited only by the noise level of the system. Additionally, the frequency response characteristics of such a system can be very good, easily demodulating phase variations with frequency content up to 50 MHz.

A problem with this technique occurs when the interference condition is driven to or beyond an interference extremum. At the extremum, the sensitivity of the technique is identically zero. If the interference condition is driven beyond an extremum, then ambiguity occurs as to the change in phase angle. One can only know the phase angle to within an additive constant $n\lambda/2$, where n may take on integer values.

As a result, the fringe counting technique offers good range characteristics with limited resolution and bandwidth, while the phase demodulation method offers good resolution and bandwidth characteristics with a very limited displacement range. For certain applications it is desirable to obtain the best characteristics of each demodulation scheme combined in a single method wherein one obtains good resolution and bandwidth, as well as extended range.

The present invention is directed to minimizing the difficulties in the prior systems.

SUMMARY OF THE INVENTION

According to this invention two interference signals are processed to reconstruct a target image. A laser beam is split into a reference beam and a measurement beam. In turn the reference beam is split into two sub-reference beams. A phase shift is introduced into one of the sub-reference beams, the phase shift being substantially 90 degrees. A measurement beam is reflected from a surface of a moving target, and split into two sub-measurement beams.

A first respective sub-reference beam is combined with a first sub-measurement beam, and the second sub-reference beam is combined with the second sub-measurement beam, and the in phase and out of phase signals reconstruct the target surface motion.

Adjustment of the split sub-reference beams is effected by Pockels cells to achieve the desired phase difference between the two sub-reference beams.

The reconstructed motion of the target surface is effected with a selected frequency characteristic, spatial resolution and range characteristic.

The invention is further described with reference to the accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

An interferometer comprises a laser source for creating an energy beam. There are means for splitting the energy beam into a reference beam and a measurement beam. There are also means for splitting the reference beam into two sub-reference beams.

A phase shift is introduced into one of the sub-reference beams, and there are means for extracting the measurement beam and directing the extracted beam toward a target; and means for reflecting the measurement beam from the surface of a target.

Means are provided for splitting the reflected measurement beam into two sub-measurement beams. A first respective sub-reference beam is combined with a first sub-measurement beam, and the second sub-reference beam is combined with the second sub-measurement beam.

There are means for observing interference beam between the respective combined beams; and means for detecting the in phase and out of phase signals for reconstructing the target surface.

Optical Design

Figure 1:
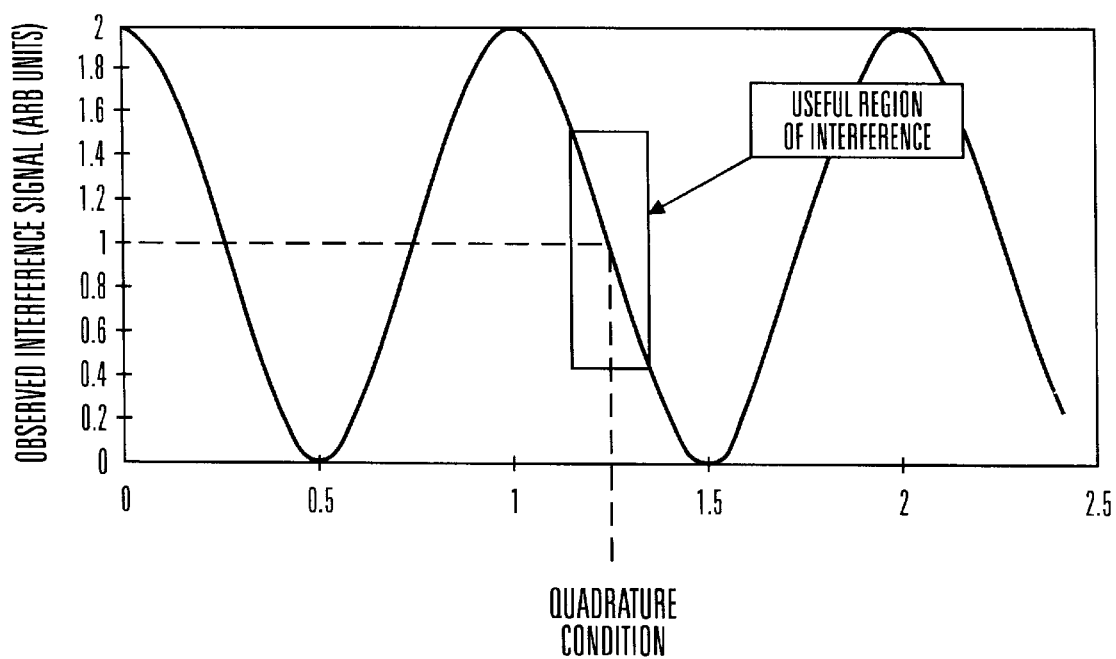
FIG. 1 is a graphical representation of the interference equation of the observed interference signal; plotted against path length difference, and showing the useful region for high resolution displacement demodulation applications
Figure 2:
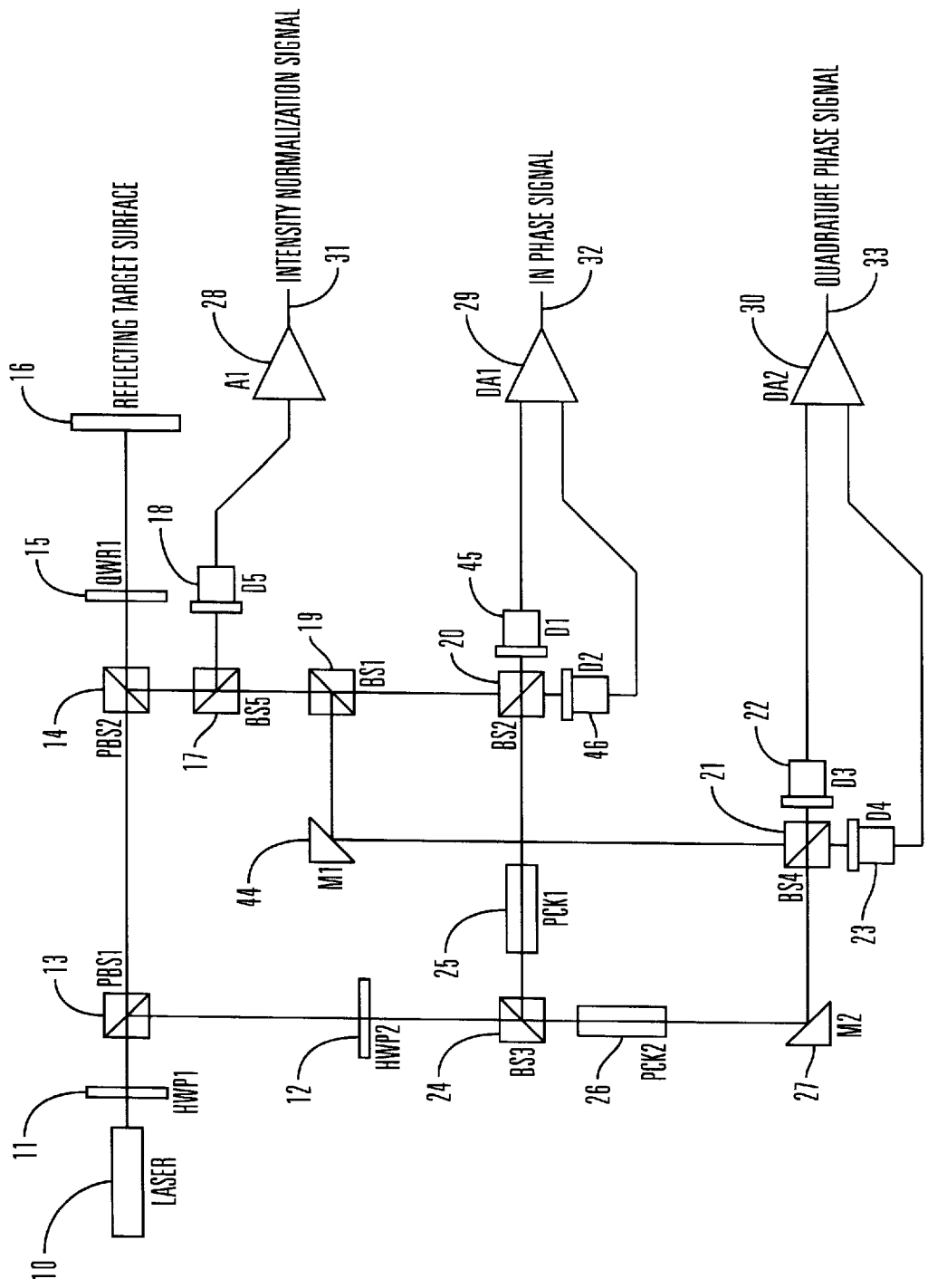
FIG. 2 illustrates an optical layout of high performance split phase interferometer according to the present invention.

The invention is described with reference to FIG. 2. Exiting the laser source 10, the polarization angle of the main beam is rotated by the half wave plate retarder [HWP1]. The main beam is then split into two beams (the reference beam and the measurement beam) at polarizing beam splitter #1 [PBS1] 13. The polarization state of the reference beam is restored by a second half wave plate retarder [HWP2] 12.

The reference beam is then further split into two reference beams ($U_{r1}$ and $U_{r2}$) at beam splitter #3. [BS3] 24, where U represents the complex wavefunction of the light beam. A 90 degree phase shift is introduced into one of the reference beams ($U_{r2}$) by means of the Pockels cells #1 and #2 [PCK1, PCK2] 25, 26. The method of adjusting the Pockels cells to achieve the desired phase difference is described in a separate section.

The measurement beam is extracted from the system through polarizing beam splitter #2 [PBS2] 14 and directed toward the moving target [Target] through the quarter wave plate retarder [QWP1] 15. Light reflected from the target re-enters the system at the quarter wave plate retarder [QWP1] 15 and hence is directed to polarizing beam splitter #2 [PBS2] 14. From [PBS2] 14 the measurement beam is directed towards beam splitter #5 [BS5] 17. From [BS5] 17 a portion of the measurement beam is directed to detector #5 [D5] 18, the signal from which will later be used as a gauge of the light intensity returned from the target surface.

The remaining portion of the light proceeds from beam splitter #5 to beam splitter #1, which splits the measurement beam into to sub beans ($U_{m1}$ and $U_{m2}$). The two measurement beams ($U_{m1}$ and $U_{m2}$) are combined with the two reference beams ($U_{r1}$ and $U_{r2}$) at beam splitters #2 and #4 (BS2 and BS4) 20, 21. Optical interference between the beams is observed at the detectors and appears as sum and difference signal at detector pairs [D1, D2] 45, 46 and [D3, D4] 22, 23. The difference between the intensity sum $|U_{mn}+U_{mn}|^2$, n=1,2, and the intensity difference signals $|U_{mn}+U_{mn}|^2$ is amplified differentially at differential amplifiers [DA1, DA2] 29, 30. From the interference equation, it can be shown that the difference signal observed at the output of DA1 29 will be proportional to $\cos(2\pi/\lambda)$, where d is the path length difference between the reference beam and the measurement beam and $\lambda$ is the wavelength of light used.

By a similar argument, the difference signal observed at the output of DA2 30 will be proportional to $\sin(2\pi/\lambda)$, by virtue of the 90 degree phase shift introduced into reference beam $U_{r2}$ by Pockels calls [PCK1, PCK2] 25, 26. The in-phase and out-phase signals can then be used to reconstruct the motion of the target surface. The reconstruction can be effected with good frequency characteristics, good spatial resolution, and good range characteristics. A method for re-constructing the target motion is given in the next two paragraphs.

Analog Front End

Figure 3A:
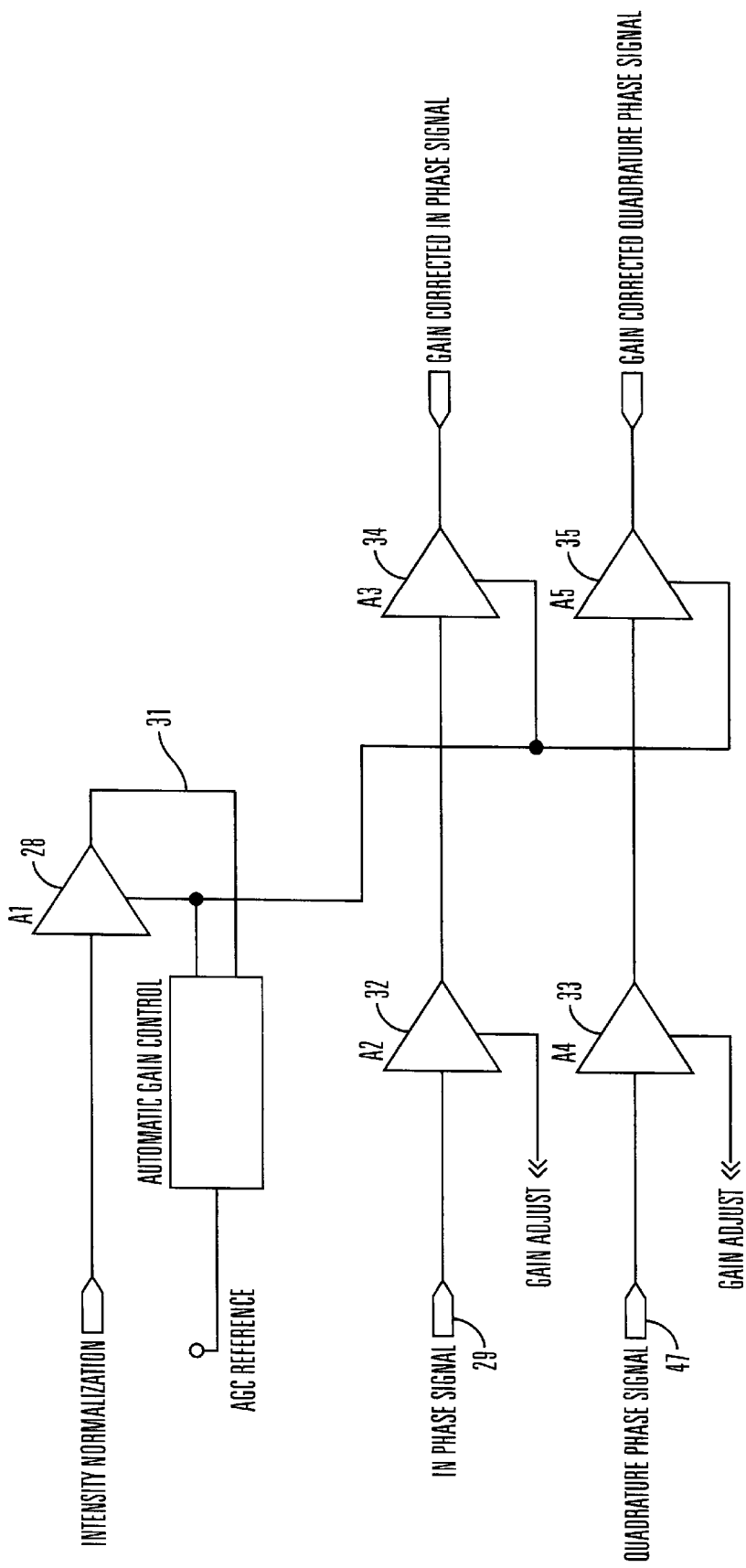
FIG. 3a illustrates an analog front end for a high performance split phase interferometer.

The following discussion refers to FIG. 3a and covers the analog front end to the digital signal processing back end. Amplifier A1 28 is part of an automatic gain control loop wherein the gain of amplifier A1 28 is controlled to maintain a fixed output level that matches the value of the AGC reference voltage. The gains of amplifiers A3 34 and A5 35 are slaved to the gain of amplifier A1 28. This adjustable gain compensates for several variations in returned light intensity such as variation in laser output, variations in target reflectivity and light loss from focus error. Variable gain amplifiers A2 32 and A4 47 are adjusted so that the outputs of A3 34 and A5 35 span the expected input range of the analog to digital converters as the system traverses from an interference maximum to an interference minimum.

Digital Signal Processing Portion

Figure 3B:
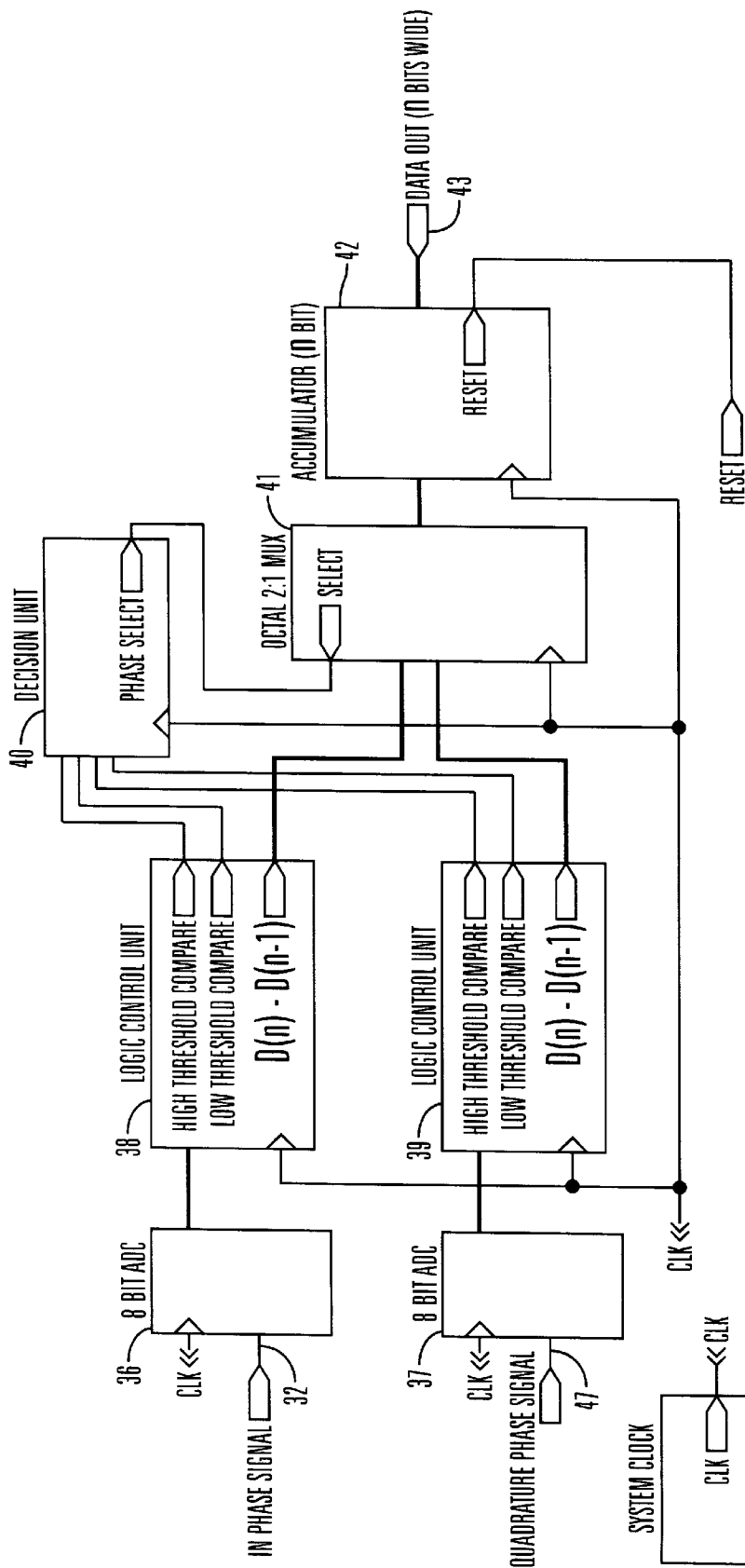
FIG. 3b illustrates a signal processing block diagram for a high performance split phase interferometer

FIG. 3b shows a block diagram of a digital signal processing system that could be used to reconstruct the target motion from the in phase and quadrature phase signals 47. Since analog phase demodulation works best when the interference signal is at or near the quadrature condition, the approach in the split phase design is to utilize whichever signal is closer to the quadrature condition. This is done by comparing the in phase signal 32 to certain pre-set high and low thresholds. The high and low thresholds should be set for +50 percent and −50 percent of the full scale excursion (+/−100 percent center).

When the signal level is between these two thresholds, then the in phase signal 32 is used as the source to feed the accumulator 42. If either threshold is exceeded, then the quadrature phase signal 47 is selected to feed the accumulator 42. When in the phase thresholds are again satisfied, the in phase signal 32 is selected, et cetera. To establish the DC reference level, the accumulator 42 can be reset at any time by a RESET command. A more detailed discussion follows.

An 8 bit A–D converter has been assumed for this design. Such devices are readily available at high sampling rates, e.g., 100 million samples per second. Since the quantization levels are distributed among ¼ wavelength of light, this gives subnanometer resolution for the quantization levels. The design described herein is synchronous. All of the DSP components are clocked by a common system clock. The clock runs at a rate limited by the slowest computational element. It is therefore important to choose elements that are well matched for computational time and propagation delays.

The digitized in phase and quadrature phase signals 29, 47 are routed to respective logic control units 38, 39. The logic control units 38, 39 perform two functions. The first function is to compute the difference between the sample value at time interval n and the sample value at time interval n−1. This value is placed in an output register. The second function is to compare the input signal value to the preset +50 percent and −50 percent thresholds. The results of these digital compare operations are provided as outputs from the logic control unit 38. The decision unit 40 receives the comparator results from the logic control unit 38. Although the schematic has been drawn symmetrically, the decision unit 40 need only consider the comparator results from one of the logic control units 38, 39. The decision unit 40 chooses either the in phase or quadrature phase signal 29, 47 based on the following truth table (assumes comparator signals from in phase LCU are used).

| high threshold exceeded | low threshold exceeded | action |
| --- | --- | --- |
| T | T | not a valid condition |
| F | T | select quadrature phase |
| T | F | select quadrature phase |
| F | F | select in phase |

The output register of the selected logic control unit 38 is passed to the accumulator 42 where it is added to the running total which represents the cumulative displacement since the most recent system reset.

Pockels Cell Adjustment

The 90 degree phase separation between the two reference beams could, in principle, be achieved by extremely careful and precise positioning of components to control the path lengths of the two reference beams. In practice such extremely precise positioning of components is not feasible. The required phase adjustment can be obtained through Pockels cells [PCK1 and PCK2] 25, 26 inserted into the path of each reference beam.

The Pockels cells are adjusted to maintain a fixed 90 degree phase difference between the two reference beams with respect to the measurement beam as seen at each detector pair [D1,D1] 45, 46 and [D3,D4] 22, 23. This is done as follows. The target is held stationary. Pockels cells #1 and #2 are controlled to produce a phase modulation at some convenient frequency. The modulation voltage for each Pockels cell is a symmetrically varying sinusoidal signal about a DC level and is of an amplitude sufficient to cause +/−90 degree phase shifts in each reference beam. While the AC portion of the control voltage is synchronous for each cell, the DC offset voltage may be varied independently. The difference between the two DC levels is varied until a 90 degree phase separation is observed between the in phase and quadrature phase signals 29, 47. When the 90 degree phase separation is obtained, the AC portion of the control voltage to each Pockels cell is suspended, while the DC portions of the control voltages to each Pockels cell is maintained. The desired 90 degree phase shift is thereby obtained.

A split phase variation of the Mch-Zehnder interferometer, as described above and in FIG. 3, is claimed. In this innovation, the reference beam is split into two reference beams which are maintained at a 90 degree phase separation with respect to the measurement beam. The phase difference between the two beams is maintained by means of Pockels cells inserted in the reference beam paths.

In summary, the invention is directed to a novel manner of processing the two interference signals to reconstruct the target motion. As such, the signal from the detector pair which is operating in the quadrature region of the interference response curve is chosen as input to the accumulator 42. Adjusting the 90 degree phase difference between the two referenced beams is a further aspect of the invention.

The foregoing description of the preferred embodiment of the invention has been presented for the purposes of illustration and description. It is not intended to be exhaustive or to limit the invention to the precise form disclosed. Many modifications and variations are possible in light of the above teaching. For instance, additional reference and measurement beam splits may be possible. Instead of one or both Pockel cells, which are means for generating phase shifts in the beams by introducing different biasing voltages, there may be other techniques for introducing the phase shift, for instance changing the path length of one of the beams. the invention will have application to energy beams in the electromagnetic energy spectrum beyond that of visible light.

It is intended that the scope of the invention be limited not by this detailed description, but rather by the following claims.

What is claimed is:

1. An interferometer comprising:
   a laser source for creating an energy beam;
   means for splitting the energy beam into a reference beam and a measurement beam;
   means for splitting the reference beam into two sub-reference beams;
   means for introducing a phase shift into one of the sub-reference beams;
   means for extracting the measurement beam and directing the extracted beam toward a target;
   means for reflecting the measurement beam from the surface of a target;
   means for splitting the reflected measurement beam into two sub-measurement beams;
   combining a first respective sub-reference beam with a first sub-measurement beam, and the second sub-reference beam with the second sub-measurement beam;
   means for observing interference beam between the respective combined beams; and
   means for detecting an in phase signal and an out of phase signal for reconstructing the target surface.

2. An interferometer as claimed in claim 1 including means for rotating the generated energy beam such that the polarized state of the main beam is rotated by a half wave plate retarder.

3. An interferometer as claimed in claim 2 wherein the reference beam is restored by second half wave plate retarder.

4. An interferometer as claimed in claim 1 wherein the reference beams are split, and including a Pockels cell for adjusting at least one of the sub reference beams to achieve the desired phase difference between the two sub-reference beams.

5. An interferometer as claimed in claim 1 wherein the measurement beam is extracted from the system through a polarizing beam splitter and directed towards a moving target through a quarter wave plate retarder, and wherein the energy is reflected from the target area and enters the system through a quarter wave plate retarder.

6. An interferometer as claimed in claim 5 wherein the beam from the quarter wave retarder is directed to a polarizing beam splitter for splitting the beam and creating a signal for use as a gauge of energy intensity returned from the target surface.

7. An interferometer as claimed in claim 1 wherein the interference signal is observed through detectors selectively to determine the sum and difference signals of the respective sub-beams.

8. An interferometer as claimed in claim 1 including means for amplifying the interference signals and means for using the in phase and out phase signals to reconstruct the motion of the target surface, the reconstruction being effected with a selected frequency characteristic, spatial resolution and range characteristic.

9. An interferometer comprising:
   a laser source for creating an light beam;
   means for splitting the light beam into a reference beam and a measurement beam;
   means for splitting the reference beam into two sub-reference beams;
   means for introducing a phase shift into one of the sub-reference beams, the phase shift being substantially 90 degrees;
   means for extracting the measurement beam and directing the extracted beam toward a surface of a moving target;
   means for reflecting the measurement beam from the surface of a target;
   means for splitting the reflected measurement beam into two sub-measurement beams;
   combining a first respective sub-reference beam with a first sub-measurement beam, and the second sub-reference beam with the second sub-measurement beam;
   means for observing interference beam between the respective combined beams; and
   means for detecting an in-phase signal and an out of phase, preferably quadrature, signal for reconstructing the target surface.

10. An interferometer as claimed in claim 9 including means for rotating the generated energy beam such that the polarized state of the main beam is rotated by a half wave plate retarder, and wherein the reference beam is restored by second half wave plate retarder.

11. An interferometer as claimed in claim 9 wherein the reference beams are split, and including Pockels cells, the cells being for adjusting at lest one of the sub reference beams to achieve the desired phase difference between the two sub-reference beams.

12. An interferometer as claimed in claim 9 wherein the measurement beam is extracted from the system through a polarizing beam splitter and directed towards a moving target through a quarter wave plate retarder, and wherein the energy is reflected from the target area and enters the system through a quarter wave plate retarder.

13. An interferometer as claimed in claim 9 wherein the interference signal is observed through detectors selectively to determine the sum and difference signals of the respective sub-beams, and including means for amplifying the interference signals and means for using the in phase and out phase signals to reconstruct the motion of the target surface, the reconstruction being effected with a selected frequency characteristic, spatial resolution and range characteristic.

14. A method of processing two interference signals to reconstruct a target image comprising:

generating a laser beam;

splitting the laser beam into a reference beam and a measurement beam;

splitting the reference beam into two sub-reference beams;

introducing a phase shift into one of the sub-reference beams, the phase shift being substantially 90 degrees;

extracting the measurement beam and directing the extracted beam toward a surface of a moving target;

reflecting the measurement beam from the surface of a target;

splitting the reflected measurement beam into two sub-measurement beams;

combining a first respective sub-reference beam with a first sub-measurement beam, and the second sub-reference beam with the second sub-measurement beam;

observing interference beam between the respective combined beams; and detecting an in phase signal and an out of phase signal for reconstructing the target surface.

15. A method as claimed in claim 14 including rotating the generated energy beam such that the polarized state of the main beam is rotated by a half wave plate retarder, and wherein the reference beam is restored by second half wave plate retarder.

16. A method as claimed in claim 14 wherein the reference beams are split, and including adjusting at least one of the split sub-reference beams thereby to be able to achieve the desired phase difference between the two sub-reference beams.

17. A method as claimed in claim 14 including detecting the interference signal to observe selectively the sum and difference signals of the respective sub-beams, and using the in phase and out phase signals to reconstruct the motion of the target surface, the reconstruction being effected with a selected frequency characteristic, spatial resolution and range characteristic.

18. A method of introducing a phase shift into a beam comprising:

splitting the beam into two sub-beams; and adjusting at least one of the beams thereby to be able to achieve the desired phase difference between the two beams.

19. A method as claimed in claim 18 including Pockels cells, the cells being for adjusting at least one of the sub-beams to achieve the desired phase difference between the two sub-beams.

20. A method as claimed in claim 18 wherein the phase shift being substantially 90 degrees.

* * * * *